US012063219B2

(12) United States Patent
Simakov et al.

(10) Patent No.: US 12,063,219 B2
(45) Date of Patent: Aug. 13, 2024

(54) NETWORK-BASED KERBEROS TICKET FORGERY DETECTION

(71) Applicant: CrowdStrike, Inc., Sunnyvale, CA (US)

(72) Inventors: Marina Simakov, Ashdod (IL); Sagi Sheinfeld, Tel Aviv (IL)

(73) Assignee: CrowdStrike, Inc., Sunnyvale, CA (US)

( * ) Notice: Subject to any disclaimer, the term of this patent is extended or adjusted under 35 U.S.C. 154(b) by 293 days.

(21) Appl. No.: 17/063,931

(22) Filed: Oct. 6, 2020

(65) Prior Publication Data

US 2021/0105285 A1   Apr. 8, 2021

Related U.S. Application Data

(60) Provisional application No. 62/911,732, filed on Oct. 7, 2019.

(51) Int. Cl.
*H04L 9/40* (2022.01)
*G06Q 30/018* (2023.01)
*H04L 9/32* (2006.01)

(52) U.S. Cl.
CPC ....... *H04L 63/108* (2013.01); *G06Q 30/0185* (2013.01); *H04L 9/3236* (2013.01); *H04L 63/0807* (2013.01); *H04L 2463/082* (2013.01)

(58) Field of Classification Search
CPC . H04L 63/108; H04L 9/3236; H04L 63/0807; H04L 2463/082; G06Q 30/0185
See application file for complete search history.

(56) References Cited

U.S. PATENT DOCUMENTS

| | | | | |
|---|---|---|---|---|
| 6,732,179 | B1 * | 5/2004 | Brown | H04L 12/2861 709/225 |
| 7,730,137 | B1 * | 6/2010 | Toomey | H04L 51/212 713/153 |
| 9,807,104 | B1 * | 10/2017 | Sarra | H04L 63/102 |
| 2002/0049912 | A1 * | 4/2002 | Honjo | H04L 63/20 726/10 |
| 2004/0083297 | A1 * | 4/2004 | Gazzetta | H04L 63/083 709/228 |

(Continued)

FOREIGN PATENT DOCUMENTS

| | | |
|---|---|---|
| EP | 3213209 A2 | 9/2017 |
| WO | WO2016035015 A1 | 3/2016 |

OTHER PUBLICATIONS

Extended European Search Report mailed Jan. 15, 2021 for European Patent Application No. 20200613.6, 9 pages.

*Primary Examiner* — Farid Homayounmehr
*Assistant Examiner* — Mudasiru K Olaegbe
(74) *Attorney, Agent, or Firm* — Lee & Hayes, P.C.

(57) ABSTRACT

Methods and systems for detecting forged Kerberos protocol tickets are presented. In one embodiment, a method is presented that includes receiving and decrypting an authentication request including a ticket. A validity start time and a validity end time may then be extracted from the ticket and a validity period may be calculated based on the validity start time and the validity end time. The method may then include retrieving a domain validity period from a domain controller and comparing the validity period to the domain validity period. If the validity period differs from the domain validity period, the authentication request may be blocked.

20 Claims, 5 Drawing Sheets

(56) References Cited

U.S. PATENT DOCUMENTS

| | | | |
|---|---|---|---|
| 2006/0087691 A1* | 4/2006 | Matsugashita | G06F 3/1285 |
| | | | 358/1.15 |
| 2016/0065565 A1* | 3/2016 | Plotnik | H04L 63/0807 |
| | | | 726/10 |
| 2016/0330220 A1* | 11/2016 | Dulkin | H04L 63/20 |
| 2017/0244730 A1* | 8/2017 | Sancheti | H04L 63/205 |
| 2021/0105285 A1 | 4/2021 | Simakov et al. | |
| 2023/0113332 A1* | 4/2023 | Crabtree | G06F 21/554 |
| | | | 726/22 |

* cited by examiner

NETWORK-BASED KERBEROS TICKET FORGERY DETECTION

CROSS-REFERENCE TO RELATED APPLICATIONS

The present application claims priority to U.S. Provisional Patent Application No. 62/911,732, filed on Oct. 7, 2019 and entitled "NETWORK-BASED KERBEROS TICKET FORGERY DETECTION," which is incorporated by reference in its entirety for all purposes.

BACKGROUND

Computers within computer networks may request access to other computers within the network and/or to a domain server on the network. For example, a domain server, such as an application server or a proxy server, or another computing device on the network may provide one or more services (e.g., application services, proxy services). Computers on the network may request access to the server in order to access the provided services.

However, to protect and restrict access to the provided services, access to the services is restricted to users with access permission. Computer networks rely on authentication protocols to verify user identities and enforce access permissions. These authentication protocols may be implemented by a server connected to the network and may process authentication requests prior to permitting access to services.

SUMMARY

The present disclosure presents new and innovative systems and methods for detecting forged tickets for use with a Kerberos authentication protocol. In one embodiment, a method is provided comprising receiving an authentication request including a ticket, decrypting the authentication request and the ticket, and extracting a validity start time and a validity end time from the ticket. The method may also include calculating a validity period based on the validity start time and the validity end time, retrieving a domain validity period from a domain controller, comparing the validity period to the domain validity period, and blocking the authentication request responsive to determining that the validity period differs from the domain validity period.

In another embodiment, the authentication request is a TGS-REQ request directed to the domain controller according to the kerberos protocol and the ticket is a ticket granting ticket.

In a further embodiment, decrypting the authentication request and the ticket further comprises extracting, from the domain controller, a password hash for a key distribution service center account and decrypting the authentication request and the ticket with the password hash.

In yet another embodiment, the authentication request is an AP-REQ request directed to a domain server according to the kerberos protocol and the ticket is a ticket granting service ticket.

In a still further embodiment, decrypting the authentication request and the ticket further comprises extracting, from the domain controller, a password hash associated with a key distribution service center account and decrypting the authentication request and the ticket with the password hash.

In another embodiment, blocking the authentication request includes one or more of denying the authentication request, alerting a user to the authentication request, presenting a multi-factor authentication challenge, and requesting additional information regarding network traffic of a computing device associated with the authentication request from a domain controller.

In a further embodiment, a method a provided comprising receiving an authentication request including a ticket, decrypting the authentication request and the ticket, and extracting validation information from the authentication request including (i) a user security ID, (ii) a primary group identifier, and (iii) group membership data. The method may further comprise extracting a principal name from the ticket, and retrieving, from a domain controller, user information associated with the principal name, including (i) a user security ID, (ii) a user group identifier, and (iii) user group membership data. The method may also include comparing the validation information and the user information and blocking the authentication request responsive to identifying at least one difference between the validation information and the user information.

In yet another embodiment, the method further includes extracting at least one request time stamp including one or more of a log on time, a log off time, a kick off time, a last successful log on time, a last failed log on time, and a password last set time and comparing the request time stamp to a corresponding default time stamp value. The method may also include determining that the request time stamp matches the corresponding default time stamp value and blocking the authentication request.

In a still further embodiment, the at least one request time stamp includes each of the log on time, the log off time, the kick off time, the last successful log on time, the last failed log on time, and the password last set time.

In another embodiment, the authentication request is a TGS-REQ request directed to the domain controller according to the kerberos protocol and the ticket is a ticket granting ticket.

In a further embodiment, decrypting the authentication request and the ticket further comprises extracting, from the domain controller, a password hash for a user account associated with a key distribution service center account and decrypting the authentication request and the ticket with the password hash.

In a still further embodiment, the authentication request is an AP-REQ request directed to a domain server according to the kerberos protocol and the ticket is a ticket granting service ticket.

In yet another embodiment, decrypting the authentication request and the ticket further comprises extracting, from the domain controller, a password hash associated with the domain server and decrypting the authentication request and the ticket with the password hash.

In a further embodiment, a method is provided comprising receiving an authentication request including a ticket, decrypting the authentication request and the ticket, extracting a validity start time, a validity end time, and a principal name from the ticket, and calculating a validity period based on the validity start time and the validity end time. The method may also include extracting validation information from the authentication request including (i) a user security ID, (ii) a primary group identifier, and (iii) group membership data, and retrieving, from a domain controller, a domain validity period and user information associated with the principal name, including (i) a user security ID, (ii) a user identifier, and (iii) user group membership data. The method may further include comparing the validation information and the user information and blocking the authentication request responsive to (i) determining that the validity period is greater than the domain validity period and/or (ii) identifying at least one difference between the validation information and the user information.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Certain authentication protocols rely on tickets to authenticate users' permissions to access certain domain servers. After authentication, the users' computing device may be provided with one or more tickets. For example, after a user's credentials are verified, a ticket granting ticket (TGT) may be provided that identifies the user is authenticated. In another example, the user may utilize the TGT to verify their identity and receive a service ticket granting access to one or more domain servers. User authentication and ticket generation may be handled by a domain controller according to the protocol such as the Kerberos protocol.

However, these tickets are susceptible to forgery. If a key distribution service center account's password hash is known, a bad actor may be able to impersonate the key distribution service center account to create a forged TGT (i.e., a golden ticket) in another user's name. Similarly, if a password hash associated with an application server is known, a user with permission to access the application server may be impersonated by creating a forged service ticket (i.e., a silver ticket) and granting access to the application server to a different user or individual that lacks permission.

Figure 1:
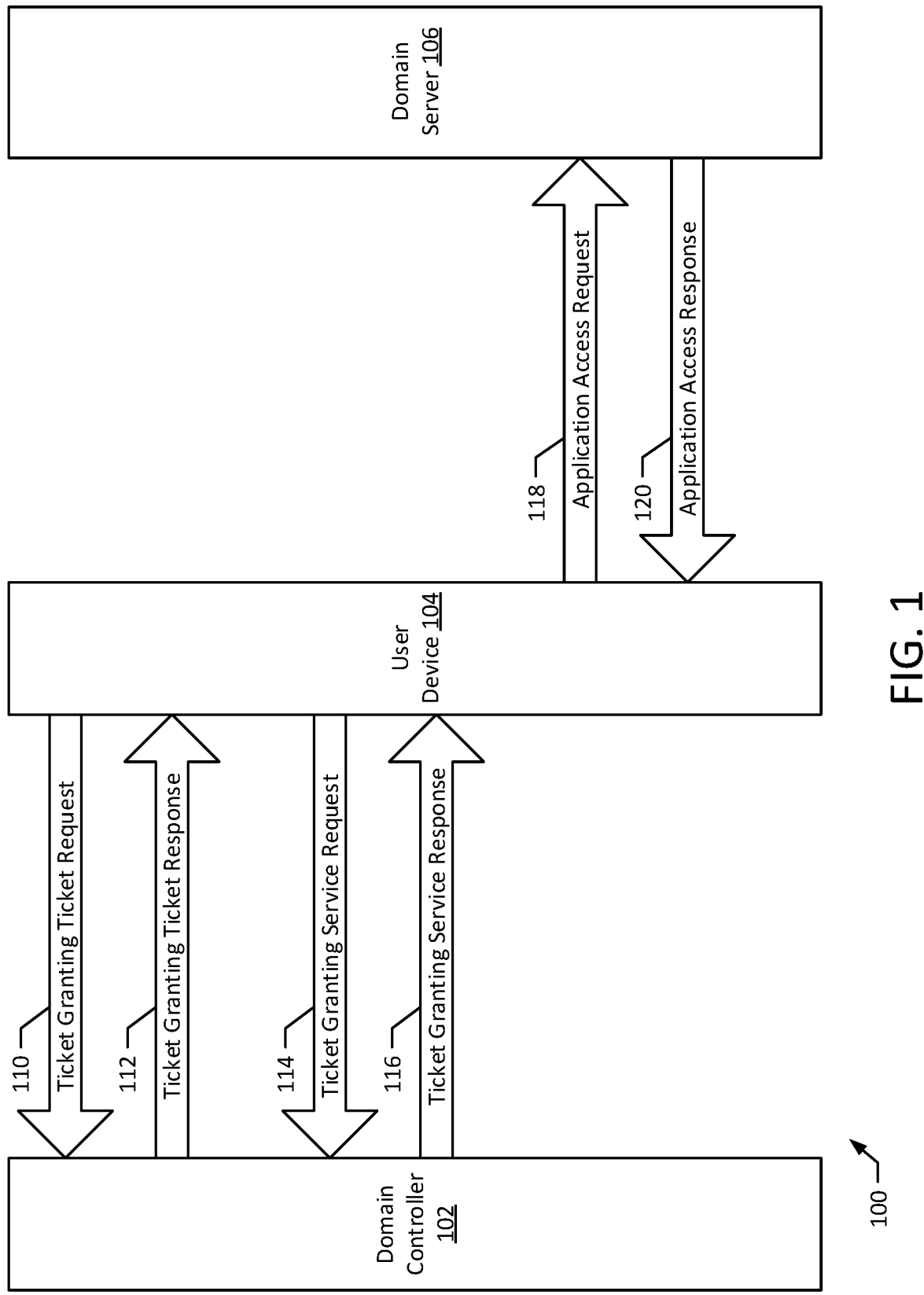
FIG. 1 illustrates an authentication message flow according to an exemplary embodiment of the present disclosure.

FIG. 1 illustrates an authentication message flow 100 according to an exemplary embodiment of the present disclosure. The message flow 100 corresponds to the Kerberos authentication protocol, which may be susceptible to the above-described golden and silver ticket forgery attacks. The message flow 100 includes a plurality of requests and responses 110, 112, 114, 116, 118, 120, which may be transmitted along a network between computing devices such as the user device 104, the domain controller 102, and the domain server 106.

To request access to a domain server 106 (e.g., a network service offered by the domain server), the user device 104 first transmits a ticket granting ticket (TGT) request 110 (e.g., an AS_REQ according to the Kerberos protocol) to the domain controller 102. The TGT request 110 may prove the identity of the user associated with the user device 104 (e.g., by providing a password hash and username associated with the user). If the domain controller 102 successfully verifies the provided authentication information, the domain controller 102 may then generate a TGT. The domain controller 102 may sign and encrypt at least a portion of the TGT with an encryption key known only to the domain controller 102, such as a password hash of a KRBTGT account acting as the key distribution service center account. In certain implementations, the domain controller 102 may also generate and include a privilege attribute certificate containing metadata on the user, such as group membership and privilege levels within the network. The privilege attribute certificate may be included in the encrypted part of the TGT. The domain controller 102 then transmits the TGT back to the user device 104 via the TGT response 112 (e.g., an AS_RESP according to the Kerberos protocol). The user device 104 may then use the TGT to subsequently request access to domain servers on the network, such as domain server 106.

To request access to the domain server 106, the user device first transmits a ticket granting service (TGS) request 114 (e.g., a TGS_REQ according to the Kerberos protocol). The TGS request 114 may identify the domain server 106 (e.g., by including a service principal name (SPN) of the domain server 106). The user device 104 may also sign and encrypt at least a part of the TGS request 114 with the session key included in the AS response 112 and may include the TGT within the encrypted part of the TGS request 114. The domain controller 102 may then decrypt the encrypted part of the TGS request 114 in order to extract and validate the TGT. Once the domain controller 102 validates the TGT, it may then generate a TGS ticket. The TGS ticket may identify the domain server 106 (e.g., the SPN of the domain server 106) and the user (e.g., a user account of the user). The domain controller 106 may encrypt at least a part of the TGS ticket with a password hash associated with the domain server 106 and may transmit the TGS ticket in a TGS response 116 (e.g., a TGS_RESP according to the Kerberos protocol).

The user device 104 may then transmit the TGS ticket to the domain server 106 via an application access request 118 (e.g., an AP_REQ according to the Kerberos protocol). The domain server 106 may decrypt the TGS ticket using the password hash associated with the domain server 106 and verify, using the user identifier included within the TGS key, that the user device 104 is permitted to access the domain server 106. Upon verifying the user device 104, the domain server 106 may grant the user device access and, in certain implementations, may transmit an application access response 120 (e.g., an AP_RESP according to the Kerberos protocol) indicating that the user device 104 may access the domain server 106.

In this way, the authentication message flow 100 enables user authentication of the user device 104 for the domain server 106 without requiring user device 104 to provide a password or password hash to the domain server 106. However, if the password hash associated with a key distribution service center account (e.g., the KRBTGT account) is known, then an attacker can forge a TGT (e.g, a golden ticket) by using the password hash to encrypt and sign the TGT. The attacker can then include the forged TGT in a TGS request to gain a TGS ticket from the domain controller. This is known as a golden ticket attack and may allow attackers to access and manipulate domain servers on a network, including altering the active directory and executing nefarious code without knowing the password hash for the domain servers.

If an attacker instead has the password hash associated with a domain server 106 (e.g., a user or machine account running a service on the domain server 106), the attacker can forge a TGS ticket (e.g., a silver ticket) by using the password hash to encrypt and sign a TGS. The attacker can then use the forged TGS to elevate a user's permissions and access domain servers 106 with compromised password hashes.

Because both the TGT and the TGS tickets are encrypted, and their contents are therefore obscured, detecting forged tickets is difficult. Existing systems may rely on monitoring the encrypted contents (e.g., an encrypted blob or binary object of the tickets) over time. For example, the domain controller may be configured with a maximum time period for which any TGT or TGS ticket may be valid (e.g., 10 hours) and may monitor tickets over time for tickets that are used longer than the maximum validity period. Upon detecting a ticket used for longer than the maximum time period (e.g., more than 10 hours), the domain controller and/or domain servers may block any associated requests. However, such strategies are insufficient, as waiting for the maximum time period to pass leaves sufficient time for an attacker to access and manipulate system services.

Further systems may analyze an encryption type used to create the key, which may be indicated within the TGS request 114 or the application access request 118. Properly-generated TGS and TGT keys may be generated using a comparatively complex and rigorous types of encryption for optimal security levels. Such encryption techniques may consume non-trivial amounts of computing resources and/or time. By contrast, an attacker may utilize simpler types of encryption to conserve computing resources and/or to more quickly generate the forged TGS and/or TGT keys. However, an attacker can bypass encryption type detection strategies by using more complex types of encryption.

One way to address the shortcomings of these strategies and to more robustly detect ticket forgery attacks is to decrypt and analyze the contents of the tickets themselves. In particular, password hashes of users and the domain servers may be gathered and used to decrypt tickets in TGS requests 114 and/or application access requests 118. The contents of the corresponding TGT and TGS tickets may then be analyzed for anomalous data, such as data that violates domain controller parameters, differs from expected user information, and/or includes signatures indicative of known attack tools, as explained further below.

Figure 2:
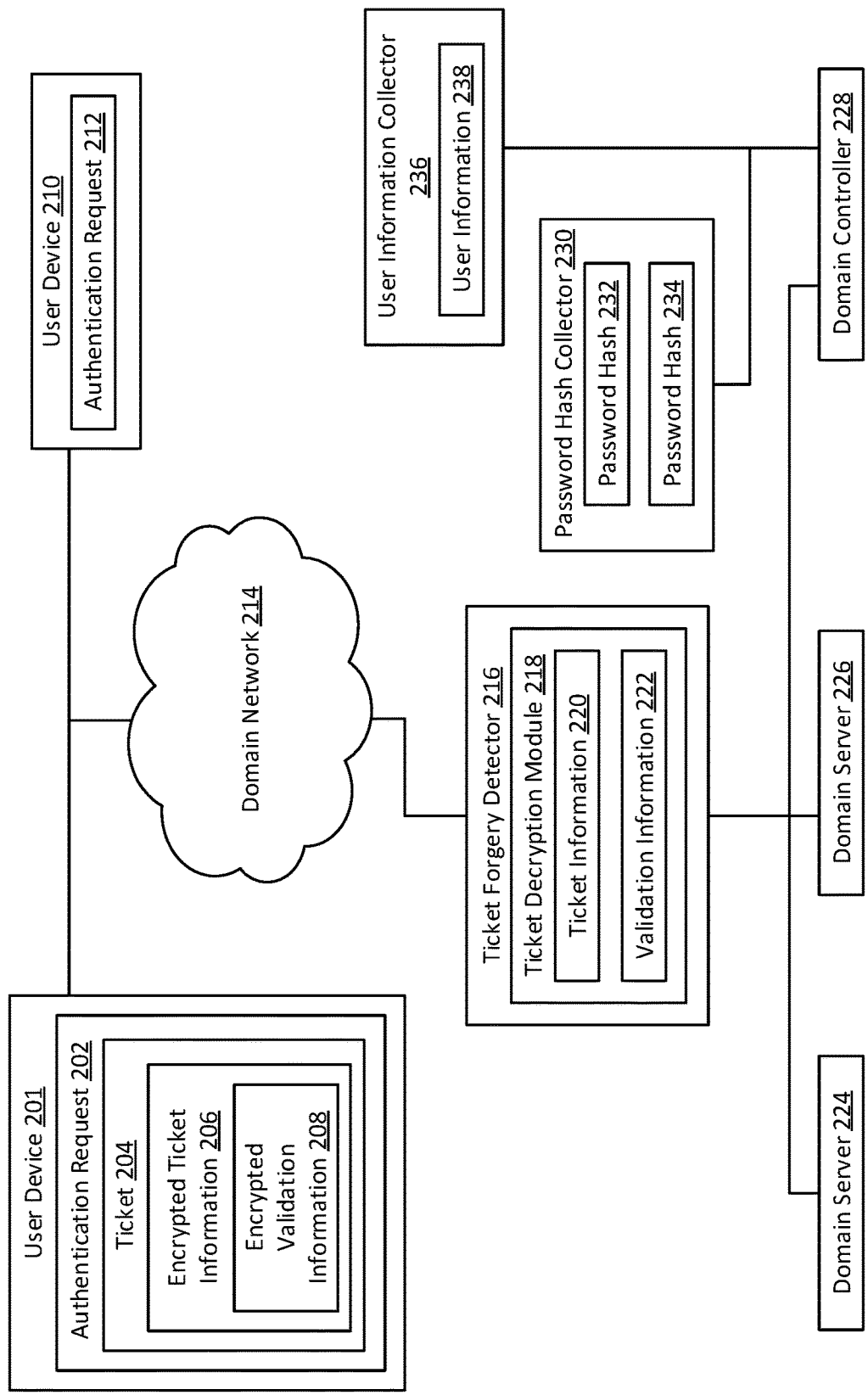
FIG. 2 illustrates a system according to an exemplary embodiment of the present disclosure.

FIG. 2 illustrates a system 200 according to an exemplary embodiment of the present disclosure. As further explained above, the system 200 may be configured to provide centralized detection of ticket forgery attacks and attempts to utilize forged tickets to access or exploit domain services. The system 200 includes user devices 201, 210 connected to a domain network 214 and a ticket forgery detector 216 also connected to the domain network 214. Domain servers 224, 226 and a domain controller 228 connect to the ticket forgery detector 216 and a password hash collector 230 and a user information collector 236 connected to the domain controller 228. The domain servers 224, 226 and the domain controller 228 may be exemplary implementations of the domain server 106 and the domain controller 102, respectively.

The user devices 201, 210 may include one or more computing devices (e.g., personal computers, laptops, tablets, smartphones, wearable devices) affiliated with a user. The user devices 201, 210 may request access using one or more authentication requests 202, 212 to access services provided by the domain server 224, 226, similar to the user device 104. For example, the authentication requests 202, 212 may be an example of a TGS request 114 and/or an application request 118, as discussed above. The authentication request 202 may include a ticket 204 (e.g., a TGT or TGS ticket), including encrypted ticket information 206, which contains encrypted validation information 208, as described further below. Although not depicted for simplicity, the authentication request 212 may include similar information. The user devices 201, 210 may transmit the authentication requests 202, 212 via the domain network 214, which may be implemented as, e.g., a local area network, a virtual private network, and/or the Internet, and may communicate via one or more wired or wireless network interfaces (e.g., Ethernet, W-Fi, cellular data).

The ticket forgery detector 216 includes a ticket decryption module 218 configured to decrypt the encrypted ticket information 206 and the encrypted validation information 208 using one or more password hashes 232, 234 stored by the password hash collector 230. For example, the password hash collector 230 may request the password hashes 232, 234 from the domain controller 228 for use by the ticket decryption module 218 by providing a user identifier (e.g., a principal name) for a key distribution service center account. The password hash collector 230 may then transmit the password hash 232, 234 to the ticket forgery detector 216 (e.g., via a direct connection, via the domain network 214). The ticket decryption module 218 may then decrypt the encrypted ticket information 206 and the encrypted validation 208 to generate ticket information 220 and validation information 222.

The ticket forgery detector 216 may then analyze the ticket information 220 and the validation information 222 for anomalous information, or for information that violates the configuration of the domain controller 228. The ticket forgery detector 216 may also or alternatively compare the ticket information 220 and/or validation information 222 to user information 238 collected by the user information collector 236 from the domain controller 228. For example, the user information collector 236 may be configured to request the user information 238 from the domain controller 228 and transmit the user information 238 to the ticket forgery detector 216 (e.g., via a direct connection and/or via the domain network 214). The ticket forgery detector 216 may then compare the user information 238 to one or both of the ticket information 220 and the validation information 222 to identify whether any differences exist as compared to the user information 238. For example, the user information 238 may include one or more pieces of information that correspond to the information included in, e.g., the ticket information 220 and the validation information 222. Additional detail regarding such analysis is provided below.

In certain implementations, one or both of the user information collector 236 and the password hash collector 230 may be implemented as software modules of the ticket forgery detector 216. Alternatively, one or both of the user information collector 236 and the password hash collector 230 may be implemented as software modules of the domain controller 228 (e.g., software modules configured to receive requests from the ticket forgery detector 216). In still further implementations, the user information collector 236 and/or password hash collector 230 may be implemented as hardware devices communicatively coupled to the domain controller 228.

The ticket forgery detector 216 may be implemented as either or both of a hardware device and/or a software module. For example, in certain implementations, the ticket forgery detector 216 may be implemented as a hardware device that intercepts and analyzes network packets for one or more domain servers 224, 226 and/or the domain controller 228. In other implementations, the ticket forgery detector 216 may be implemented as a software module that executes on one or both domain servers 224, 226 and/or the domain controller 220.

Different network configurations of the ticket forgery detector 216 may enable detection of different types of attacks. For example, to detect a forged TGS ticket, the ticket forgery detector 216 may have to intercept communications from user devices 201, 210 for domain servers 224, 226 (e.g., application access requests 118). In another example, to detect a forged TGT, the ticket forgery detector 216 may have to intercept communications from user devices 201, 210 for the domain controller (e.g., TGS requests 114). Accordingly, in certain implementations, separate ticket forgery detectors 216 may be required for each domain server 224, 226 and for the domain controller 228. In other implementations, however, the ticket forgery detector 216 may be configured to analyze communications for more than one domain server 224, 226 or domain controller 228, as depicted in FIG. 2.

One or more components of the system 200 may be implemented by a computer system. For example, the ticket forgery detector 216, the domain servers 224, 226, the domain controller 228, the user devices 201, 210, the password hash collector 230, and/or the user information collector 236 may be implemented by a computer system. In particular, one or more of the ticket forgery detector 216, the domain servers 224, 226, the domain controller 220, the user devices 201, 210, the password hash collector 230, and the user information collector 236 may include a CPU and/or a memory that may implement one or more operational features. For example, the memory may contain instructions which, when executed by the CPU, cause the CPU to perform one or more of the corresponding operational features.

Figure 3:
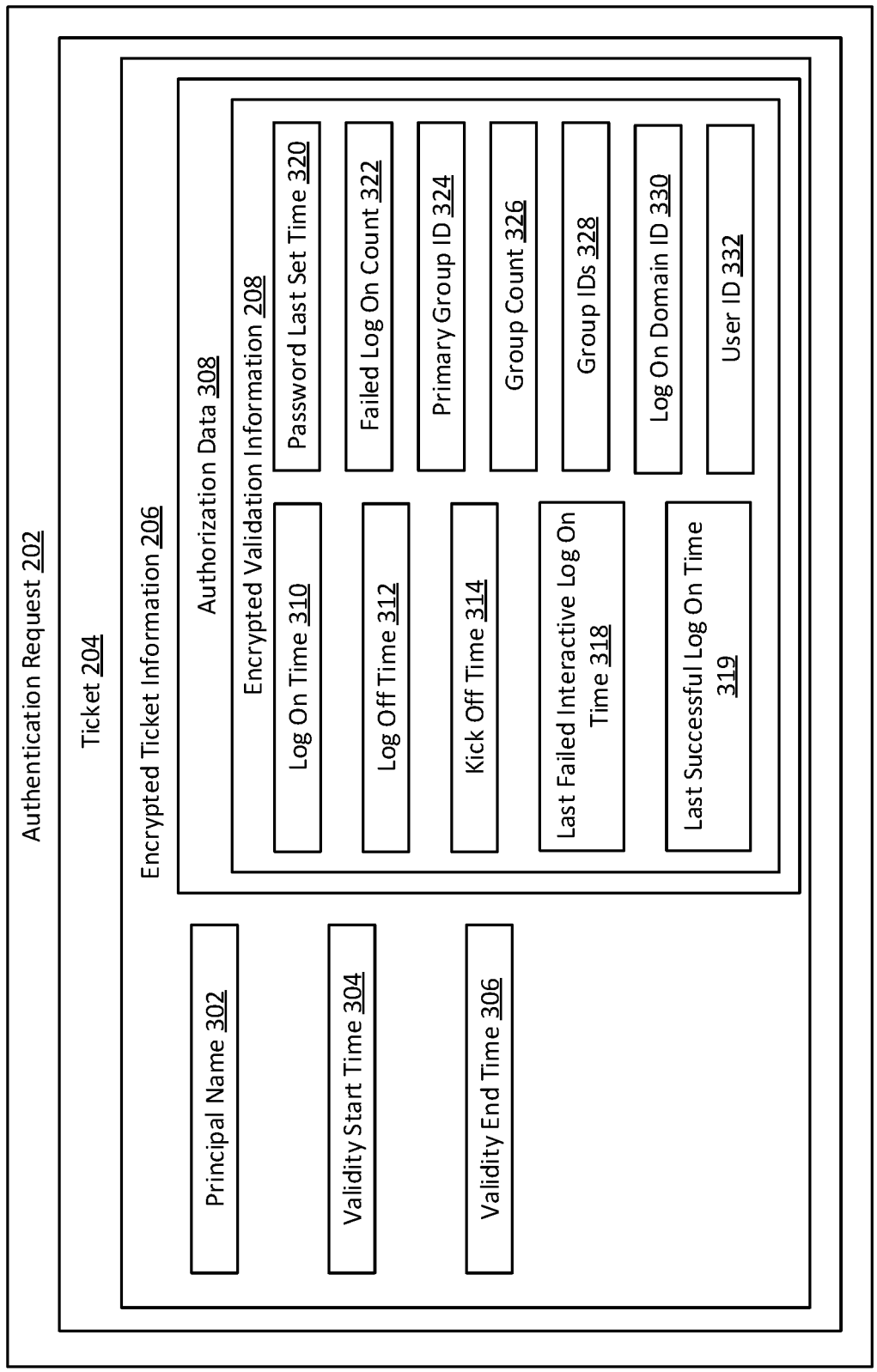
FIG. 3 illustrates an authentication request according to an exemplary embodiment of the present disclosure.

FIG. 3 illustrates an exemplary implementation of the authentication request 202 according to an exemplary embodiment of the present disclosure. The authentication request 202 may depict specific types of information included within the authentication request 202 or, similarly, the authentication request 212, generated by the user devices 201, 210. The authentication request 202 includes a ticket 204 with encrypted ticket information 206 including encrypted validation information 208 stored within authorization data 308. The ticket 204 may represent a TGT and/or a TGS ticket. For example, if the authentication request 202 is an implementation of a TGS request 114, the ticket 204 may represent a TGT. As another example, if the authentication request 202 is an implementation of an application access request 118, the ticket 204 may represent a TGS ticket. If the authentication request 202 is generated by the user device 201, 210 of an attacker, the ticket 204 may be forged using techniques explained above in connection with FIG. 1. The encrypted validation information 208 represents information regarding the user responsible for generation of the authentication request 202. Although the information contained within the encrypted validation information 208 may be accessible via the domain controller 102, forged tickets may not include accurate information in the encrypted validation information 208. In particular, although the information is available from the domain controller 102, requesting and accessing the information may risk detection by other monitoring processes. Further, attackers may not access this information to simplify the attack process and to reduce the time, effort, and complexity of initiating the attack. Accordingly, the encrypted validation information 208 may differ from expected information regarding the user. In certain implementations, the encrypted ticket information 206 may be an implementation of the EncTicketPart of a Kerberos ticket and the encrypted validation information may be an implementation of the KERB_VALIDATION_INFO structure of the Microsoft® Privilege Attribute Certificate (MS-PAC).

In particular, the encrypted ticket information 206 includes a principal name 302, which represents a principal name identifier of a user to which the ticket 204 was granted (e.g., the cname field of a Kerberos ticket). The validity start time 304 and validity end time 306 represent, respectively when a validity period for the tickets 204 begins and ends (e.g., the start time and the end time of a Kerberos ticket). The authorization data 308 may indicate meta-data regarding the requesting user. In particular, the authorization data may include the encrypted validation information 208 corresponding to the requesting user.

The encrypted validation information 208 includes a logon time 310 representing the last time a user successfully logged on and a log off time 312 representing the time a user's logon session will expire. In certain implementations, the logoff time 312 may typically be set to "never," indicating that the user's logon session will not expire. The kick off time 314 represents a time until the recipient of the authentication request 202 will forcefully disconnect a communication session with the user. In certain implementations, the kick off time 314 may typically be set to "never" unless there are restrictions on the requesting user account. The last failed interactive logon time 318 indicates a timestamp for when the user last tried and failed to logon (e.g., providing an incorrect password or password hash). Relatedly, the failed logon count 322 indicates the number of times failed interactive logon attempts by the user. Similarly, the last successful logon time 319 indicates a timestamp for when the user last successfully logged onto the domain network 214. The password last set time 320 indicates a timestamp for when the user last reset or changed the password and/or password hash (e.g., with the domain controller 228). The primary group ID 324 indicates a group of primary membership for the user and the group IDs 328 indicate additional groups to which the user is a member. The group count 326 identifies a total count for group membership by the user. For example, the domain network 214 may include one or more domains, and users may log into one of ora subset of these domains. Accordingly, the logon domain ID 330 may identify the domain to which the user belongs. The user ID 332 may include an identifier of the user, similar to the principal name 302.

If an attacker tries to initiate an authentication request 202 including a forged ticket 204, the attacker may not include accurate encrypted validation information 208 for the reasons discussed above. Rather, the attacker may simply populate the encrypted validation information 208 with default values. These default values may be provided by certain types of attack generation software.

Figure 4:
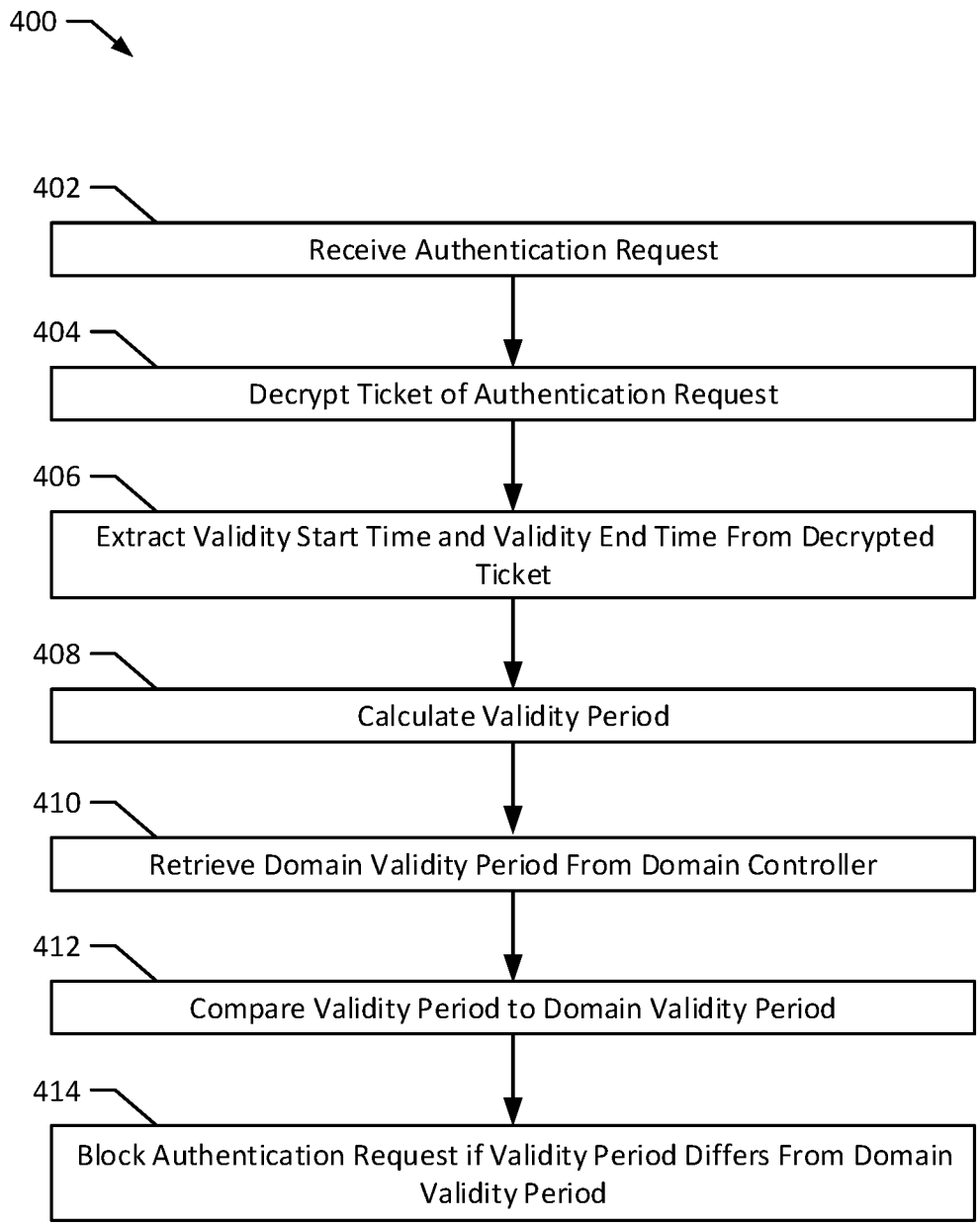
FIG. 4 illustrates a method according to an exemplary embodiment of the present disclosure.

FIG. 4 illustrates a method 400 according to an exemplary embodiment of the present disclosure. The method 400 may be performed to decrypt and analyze the contents of an authentication request 202, 212 in order to determine whether a ticket 204 within the authentication request 202, 212 has been forged. The method 400 may be implemented on a computer system, such as the computer system 200. In particular, the method 400 may be performed at least in part by one or more of the ticket forgery detector 216, the password hash collector 230, the user information collector 236, the domain servers 224, 226, and the domain controller 228. The method 400 may also be implemented by a set of instructions stored on a computer readable medium that, when executed by a processor, cause the computer system to perform the method. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional. Furthermore, the method 400 may be combined, at least in part, with one or more additional methods described in the present disclosure. For example, the method 400 may be combined, at least in part, with the method 500.

The method 400 begins with ticket forgery detector 216 receiving an authentication request 202, 212 containing a ticket 204 (block 402). As explained above, the authentication request 202, 212 may be received via the domain network 214 (e.g., via a network packet transmitted by the domain network 214). The ticket decryption module 218 may then decrypt the ticket 204 (block 404). For example, the ticket decryption module 218 may request a password hash 232, 234 corresponding to the key distribution center account or to a service for which access is requested. The password hash collector 230 may then retrieve and transmit the corresponding password hash 232, 234 to the ticket decryption module 218. For example, the password hash collector 230 may request a password hash 232, 234 corresponding to the key distribution service center account from the domain controller 228 and may transmit the received password hash 232, 234 to the ticket decryption module 218. The ticket decryption module 218 may then utilize the received password hash 232, 234 to decrypt the authentication request 202 and the tickets 204. Namely, the ticket decryption module 218 may decrypt the encrypted ticket information 206 and the encrypted validation information 208 to respectively generate the ticket information 220 and validation information 222.

The ticket forgery detector 216 may then extract a validity start time 304 and a validity end time 306 from the ticket information 220 (block 406). As explained above, the validity start time 304 and the validity end time 306 may indicate the beginning and end time stamps of a period during which the ticket 204 is valid. The ticket forgery detector 216 may then calculate a validity period or the ticket 204 (block 408). For example, the ticket forgery detector 216 may subtract the validity start time 304 from the validity end time 306 to calculate the validity period. The ticket forgery detector 216 may then retrieve a domain validity period from the domain controller 228 (block 410) and may compare the validity period to the domain validity period (block 412). The domain validity period may indicate a maximum time for which a validly-generated ticket 204 can be valid on the domain network 214. Typically, as discussed above, tickets 204 may be valid for several hours (e.g., 10 hours), although other domain validity periods are possible. In such implementations, the domain validity period may therefore indicate that the maximum time for a valid ticket is, e.g., 10 hours. Furthermore, in certain implementations, it may be very rare for a validly-generated tickets 204 to have validity periods that differ from the domain validity period. Continuing the above example, nearly all validly-generated tickets 204 may be generated with validity periods equal to the domain validity period of 10 hours. However, in order for a successful ticket forgery to last as long as possible, an attacker may set the validity start time 304 and the validity end time 306 such that the forged tickets 204 is valid for an inordinately long period of time (e.g., >10 hours, one or more days, months, or years). Similarly, an attacker may not be aware of the specific domain validity configuration of the domain network 214 and may be unable or unwilling to request the domain validity period from the domain controller 228. Therefore, the attacker may forge a ticket 204 with a validity period that is less than the domain validity period. In implementations where nearly all validly-generated tickets 204 include a validity period equal to the domain validity period, this difference may indicate that the ticket 204 was improperly forged by an attacker.

Accordingly, the ticket forgery detector 216 may block the authentication request 202, 212 if the validity period differs from the domain validity period (block 414). In blocking the authentication request 202, 212, the ticket forgery detector 216 may deny the authentication request 202, 212 and prevent further processing thereof. Additionally or alternatively, the ticket forgery detector 216 may alert a user (e.g., a system administrator user) to the authentication request 202, 212, allowing the user to take further corrective action. Further, the ticket forgery detector 216 may present a multifactor authentication challenge to the user to further verify that the user device 201, 210 transmitting the authentication request 202, 212 corresponds to the correct individual. In still further implementations, the ticket forgery detector 216 may additionally or alternatively request additional information regarding network traffic of a computing device associated with the authentication request 202, 212 from the domain controller (e.g., to review the network information for other potentially nefarious activities).

If the validity period does not differ from the domain validity period, or does not differ by a large enough amount, the ticket forgery detector 216 may permit further processing of the authentication request 202 (e.g., by the domain servers 224, 226 and/or the domain controller 228).

By performing the method 400, the ticket forgery detector 216 is therefore able to identify forged tickets 204 that violate a domain validity period without waiting and allowing forged tickets 204 to remain in use for the duration of the domain validity period, improving both detection time and security of the domain network 214.

Figure 5:
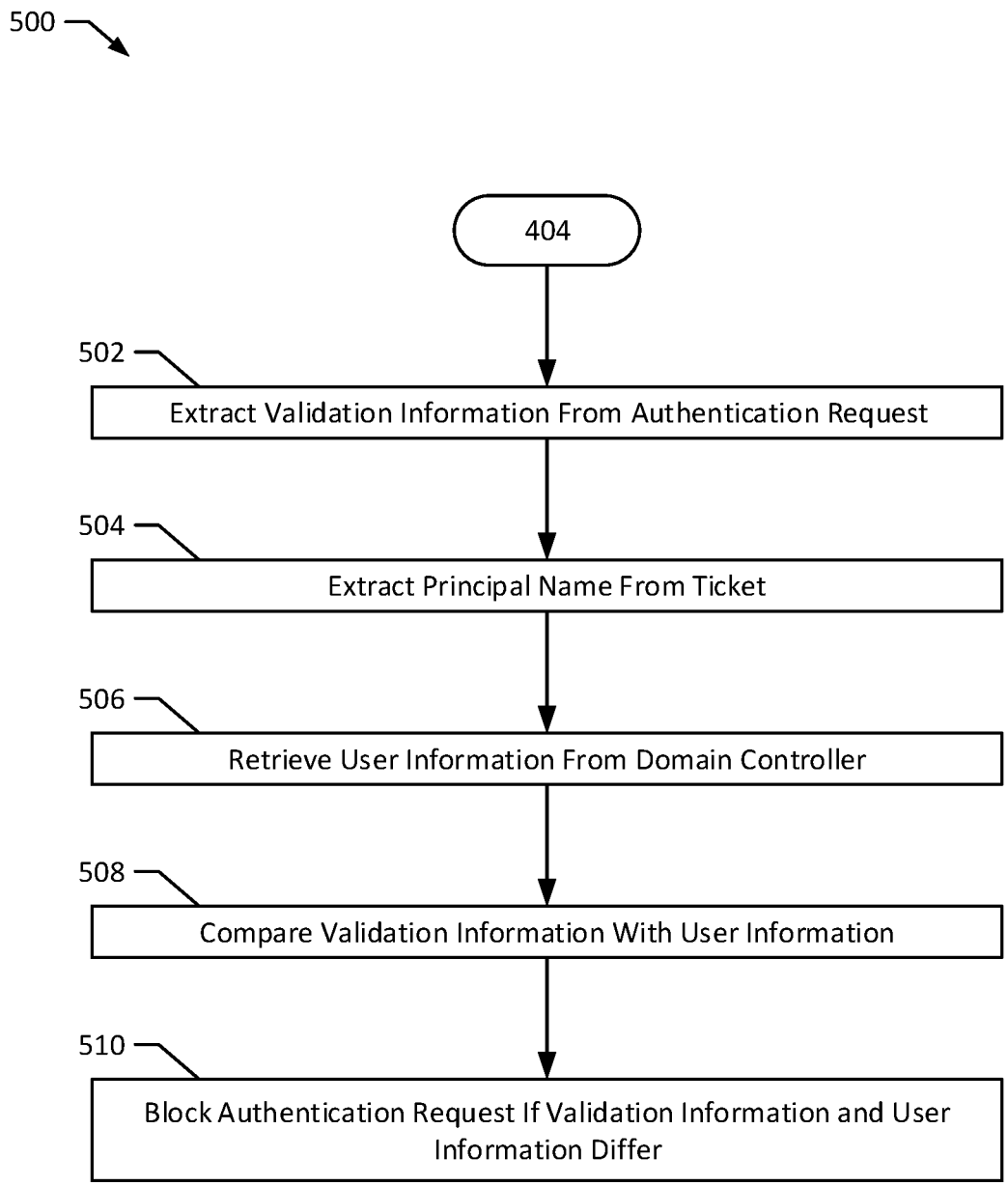
FIG. 5 illustrates a method according to an exemplary embodiment of the present disclosure.

FIG. 5 illustrates a method 500 according to an exemplary embodiment of the present disclosure. The method 500 may be performed to extract and analyze validation information 222 in comparison to user information 238 in order to detect forged tickets 204. In particular, as depicted, the method 500 may be performed after decrypting the ticket 204 at block 404 of the method 400. The method 500 may be implemented on a computer system, such as the computer system 200. In particular, the method 500 may be performed at least in part by one or more of the ticket forgery detector 216, the password hash collector 230, the user information collector 236, the domain servers 224, 226, and the domain controller 228. The method 500 may also be implemented by a set of instructions stored on a computer readable medium that, when executed by a processor, cause the computer system to perform the method. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional. Furthermore, the method 500 may be combined, at least in part, with one or more additional methods described in the present disclosure. For example, the method 500 may be combined, at least in part, with the method 400.

The method 500 begins with the ticket forgery detector 216 extracting validation information 222 from the authentication request 202, 212 (block 502). For example, the ticket decryption module 218 may extract the validation information 122 from the authentication request 202, 212 after decrypting the ticket 204 contained within the authentication request 202, 212. The validation information 122 may include all or part of the encrypted validation information 208, including one or more of the log on time 310, the log off time 312, the kick off time 314, the last failed interactive log on time 318, the last failed successful log on time 319, the password last set time 320, the failed log on count 322, the primary group ID 324, the group count 326, the group IDs 328, the log on domain ID 330, the user ID 332. In certain implementations, the ticket decryption module 218 may also determine a security ID built from the user ID 332 and the log on domain ID 330.

The ticket forgery detector 216 may then extract the principal name 302 from the ticket 204 (block 504). For example, after decrypting the ticket 204, the ticket forgery detector 216 may extract the principal name 302 from the ticket information 220. The ticket forgery detector 216 may then retrieve user information 238 from the domain controller 228 (block 506). In particular, the ticket forgery detector 216 may retrieve user information 238 corresponding to the principal name 302 via the user information collector 236, as described above. For example, the user information 238 may include information corresponding to the information included in the validation information 222, including one or more of a user log on time, a user log off time, a user kick off time, a user last successful log on time, a user last failed log on time, a user last successful log on time, and a user password last set time. Each component of the received user information 238 may correspond to a component within the validation information 222, but may instead be provided by the domain controller 228, and therefore can be relied upon as related to the user identified by the principal name 302. In one example, if the validation information 222 includes the log on time 310, the log off time 312, the kick off time 314, the last failed log on time 318, and the failed log on count 322, the user information 238 may include the corresponding components of a user log on time, a user log off time, a user kick off time, a user last failed log on time, and a user failed log on count. In preferred implementations, the ticket forgery detector 216 may retrieve the user primary group ID, user group IDs and a user security ID, which may be built from a user ID and user log on domain ID retrieved from the domain controller 228.

In certain instances, the domain controller 228 may not include information corresponding to the principal name 302. For example, where a ticket 204 includes a principal name 302 that does not exist (e.g., because the principal name 302 is forged), the domain controller 228 may not store information corresponding to the principal name. In such instances, the ticket forgery detector 216 may determine that the ticket 204 is forged based at least in part on the lack of information corresponding to the principal name 302 within the domain controller 228.

The ticket forgery detector 216 may then compare the validation information 222 with the user information 238 (block 508). For example, the ticket forgery detector 216 may compare each component of the validation information 222 with the corresponding component of the user information 238 to determine whether any of the information in the validation information 222 differs from the user information 238. Continuing the above example, the ticket forgery detector 216 may compare the log on time 310 to the user log on time, may compare the log off time 312 to the user log off time, may compare the kick off time 314 to the user kick off time, may compare the last failed log on time 318 to the user last failed log on time, and/or may compare the failed log on count 322 to the user failed log on count. In preferred embodiments, the ticket forgery detector 216 may compare the security ID built from the validation information 222 with the security ID built from the information retrieved from the domain controller 228, may compare the primary group ID 324 with the user primary group ID, and/or may compare the group IDs 328 with the user primary group IDs. If the contents of any of the compared components of the validation information 222 of the user information 238 differ from one another, the ticket forgery detector 216 may determine that the validation information the user information differ. In other implementations, the ticket forgery detector 216 may only determine that the validation information 222 and the user information 238 differ if a certain number of components differ (e.g., two components, three components, five components). As explained above in connection with the method 400, altering the components of the validation information 222 may be difficult, impossible, or unduly risky for an attacker. Accordingly, the attacker may not update the encrypted validation information 208 included with an authentication request 202 containing a forged tickets 204. Therefore, by comparing the validation information 222 with up-to-date user information 238 from the domain controller 228, the ticket forgery detector 216 may detect such failures by the attacker, indicating that the authentication request 202 may contain a forged ticket 204.

If the ticket forgery detector 216 determines that the validation information 222 and the user information 238 differ, the ticket forgery detector 216 may block the authentication request 202, 212 (block 510). The ticket forgery detector 216 may block the authentication request 202, 212 using techniques similar to those discussed above in connection with block 414.

The ticket forgery detector 216 may also compare a time stamp extracted from the validity information 222 with a corresponding default time stamp value. For example, the ticket forgery detector 216 may compare one or more of the log on time 310, the log off time 312, the kick off time 314, the last successful log on time 319, the last failed interactive log on time 318, and the password last set time 320 with known default values typically populated by common ticket forgery tools (e.g., software tools). If one or more of the compared time stamps matches the default time stamp, the ticket forgery detector 216 may block the authentication request 202, 212.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving an authentication request including a ticket;
decrypting the authentication request and the ticket;
extracting validation information from the decrypted authentication request;
extracting, from the validation information, a request time stamp including one or more of a log on time, a log off time, a kick off time, a last successful log on time, a last failed log on time, or a password last set time;
comparing the request time stamp to a corresponding known ticket-forgery-tool-populated default time stamp value; and
blocking the authentication request responsive to determining that the request time stamp matches the corresponding known ticket-forgery-tool-populated-default time stamp value.

2. The method of claim 1, wherein the authentication request is a TGS-REQ request directed to a domain controller according to the Kerberos protocol and the ticket is a ticket granting ticket.

3. The method of claim 2, wherein decrypting the authentication request and the ticket further comprises:
extracting, from the domain controller, a password hash for a key distribution service center account; and
decrypting the authentication request and the ticket with the password hash.

4. The method of claim 1, wherein the authentication request is an AP-REQ request directed to a domain server according to the Kerberos protocol and the ticket is a ticket granting service ticket.

5. The method of claim 4, wherein decrypting the authentication request and the ticket further comprises:
extracting, from a domain controller, a password hash associated with a key distribution service center account; and
decrypting the authentication request and the ticket with the password hash.

6. The method of claim 1, wherein blocking the authentication request includes one or more of denying the authentication request, alerting a user to the authentication request, presenting a multi-factor authentication challenge, and requesting additional information regarding network traffic of a computing device associated with the authentication request from a domain controller.

7. A system comprising:
a central processing unit (CPU); and
a memory couple to the CPU, the memory storing thereon computer-executable instructions that, when executed by the CPU, cause the CPU to perform operations, the operations comprising:
receiving an authentication request including a ticket;
decrypting the authentication request and the ticket;
extracting validation information from the decrypted authentication request;
extracting, from the validation information, a request time stamp including one or more of a log on time, a log off time, a kick off time, a last successful log on time, a last failed log on time, or a password last set time;
comparing the request time stamp to a corresponding known ticket-forgery-tool-populated default time stamp value; and
blocking the authentication request responsive to determining that the request time stamp matches the corresponding known ticket-forgery-tool-populated-default time stamp value.

8. The system of claim 7, wherein the authentication request is a TGS-REQ request directed to a domain controller according to the Kerberos protocol and the ticket is a ticket granting ticket.

9. The system of claim 8, wherein decrypting the authentication request and the ticket further comprises:
extracting, from the domain controller, a password hash for a user account associated with a key distribution service center account; and
decrypting the authentication request and the ticket with the password hash.

10. The system of claim 7, wherein the authentication request is an AP-REQ request directed to a domain server according to the Kerberos protocol and the ticket is a ticket granting service ticket.

11. The system of claim 10, wherein decrypting the authentication request and the ticket further comprises:
extracting, from a domain controller a password hash associated with the domain server; and
decrypting the authentication request and the ticket with the password hash.

12. A non-transitory computer-readable media storing thereon computer-executable instructions that, when executed by a central processing unit (CPU), cause the CPU to perform operations, the operations comprising:
receiving an authentication request including a ticket;
decrypting the authentication request and the ticket;
extracting validation information from the decrypted authentication request;
extracting, from the validation information, a request time stamp including one or more of a log on time, a log off time, a kick off time, a last successful log on time, a last failed log on time, or a password last set time;
comparing the request time stamp to a corresponding known ticket-forgery-tool-populated-default time stamp value; and
blocking the authentication request responsive to determining that the request time stamp matches the corresponding known ticket-forgery-tool-populated default time stamp value.

13. The system of claim 7, wherein user information corresponding to the validation information includes (i) a user security ID, (ii) a user group identifier, and (iii) user group membership data.

14. The non-transitory computer-readable media of claim 12, wherein retrieved user information corresponding to extracted validation information includes (i) a user security ID, (ii) a user group identifier, and (iii) user group membership data.

15. The system of claim 7, wherein blocking the authentication request includes one or more of denying the authentication request, alerting a user to the authentication request, presenting a multi-factor authentication challenge, and requesting additional information regarding network traffic of a computing device associated with the authentication request from a domain controller.

16. The non-transitory computer-readable media of claim 12, wherein the authentication request is a TGS-REQ request directed to a domain controller according to the Kerberos protocol and the ticket is a ticket granting ticket.

17. The non-transitory computer-readable media of claim 16, wherein decrypting the authentication request and the ticket further comprises:
- extracting, from the domain controller, a password hash for a key distribution service center account; and
- decrypting the authentication request and the ticket with the password hash.

18. The non-transitory computer-readable media of claim 12, wherein the authentication request is an AP-REQ request directed to a domain server according to the Kerberos protocol and the ticket is a ticket granting service ticket.

19. The non-transitory computer-readable media of claim 18, wherein decrypting the authentication request and the ticket further comprises:
- extracting, from a domain controller, a password hash associated with a key distribution service center account; and
- decrypting the authentication request and the ticket with the password hash.

20. The non-transitory computer-readable media of claim 12, wherein blocking the authentication request includes one or more of denying the authentication request, alerting a user to the authentication request, presenting a multi-factor authentication challenge, and requesting additional information regarding network traffic of a computing device associated with the authentication request from a domain controller.

* * * * *